United States Patent [19]
Link

[11] 3,888,532
[45] June 10, 1975

[54] FENDER GUARD

[76] Inventor: Timothy H. Link, RR 2, Toronto, Kans. 66777

[22] Filed: Jan. 2, 1974

[21] Appl. No.: 429,522

[52] U.S. Cl. .............................. 293/62; 293/71 R
[51] Int. Cl. .......................................... B60r 19/02
[58] Field of Search .................. 293/62, 60, 71 R; 280/154.5 R, 163

[56] References Cited
UNITED STATES PATENTS

| | | | |
|---|---|---|---|
| 2,119,072 | 5/1938 | Cohen | 293/62 |
| 2,227,425 | 1/1941 | Cobb | 293/62 |
| 2,691,545 | 10/1954 | Lyon | 293/62 |
| 3,226,145 | 12/1965 | Goldberg | 293/71 R X |

*Primary Examiner*—M. Henson Wood, Jr.
*Assistant Examiner*—John J. Love
*Attorney, Agent, or Firm*—John H. Widdowson

[57] ABSTRACT

This invention is a guard for a vehicle fender wherein the vehicle fender has an inner side portion secured to a vehicle, an outer sidewall portion and a forward wall portion merging into the outer sidewall portion with the outer sidewall portion having a wheel opening. The fender guard is a thin, bendable, hard surfaced, impervious material with a shaped edge portion to fit over the fender's outer sidewall portion and a forward portion to fit over the fender's forward wall portion, and it has means to secure it to the fender.

3 Claims, 4 Drawing Figures

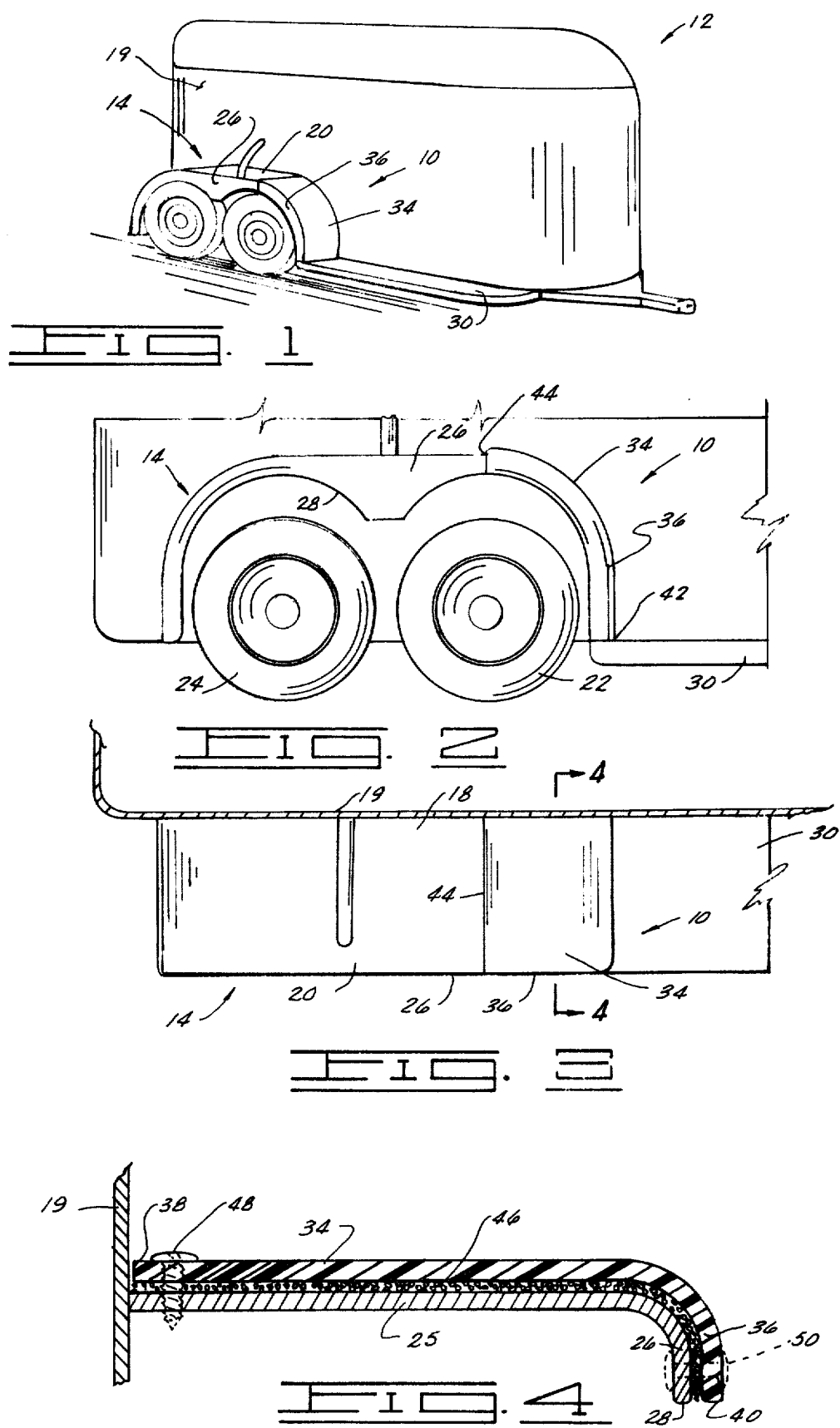

FENDER GUARD

BACKGROUND OF THE INVENTION

The invention is related to fender guards for vehicles, principally trailer type vehicles.

Numerous types of fender guard and scuff pad structures are known in the prior art which are mountable with the forward portion of a curved rear fender of an automobile to prevent gravel damage to the forward portion of the fender. Prior art structures are generally constructed of a resilient material, for example, rubber or synthetic rubber with the material being clipped over or bolted on the fender structure and held in place by a metal framework or metal fasteners embedded in the material. The known prior art devices are constructed for automobiles which have a body style wherein the fenders extend from the major portion of the body in a curved fashion. Some prior art scuff plates or fender guards are known which extend from the portion of the fender adjacent to the body to the wheel opening portion of the fender; these structures are provided with finger-like members to reach around the edge of the fender at the wheel opening to retain the fender guard in place on the fender in conjunction with other mounts or clips on the fender guard structure at the portion of the fender adjacent to the vehicle body. Other fender guard structures are merely a sheet of flexible material, such as rubber, with bead-like fasteners molded therein mountable with a fender by being inserted through holes in the fender. No substantial rigid fender guard structure is known in the prior art which is adapted for mounting on the fender of a vehicle, for example, a trailer, which extends sharply or directly from the vehicle body over the fender.

SUMMARY OF THE INVENTION

In one preferred specific embodiment, a fender guard structure is constructed of a bendable member of an essentially hard surfaced impervious material, and having a shaped edge portion to fit over the outer sidewall portion of a fender and a forward portion to fit over the forward wall portion of a fender with the member being secured to the fender. Preferably, the fender guard is constructed of a fiberglass reinforced plastic material such as polyester resin.

One object of this invention is to provide a fender guard structure overcoming the aforementioned disadvantages of the prior art devices.

Still, one other object of this invention is to provide a fender guard structure for mounting on the forward portion of vehicle fenders which extend sharply and substantially from the body of the vehicle, for example, fenders of trailers, and to provide a fender guard which is constructed of a rigid and resilient impervious material shaped to correspond with the shape of the fender and easily securable to the fender.

Still, another object of this invention is to provide a fender guard structure constructed of a fiberglass reinforced polyester resin material which is a resilient impervious material and can be secured to the forward portion of a vehicle's fender with the fender guard large enough to extend from the side of the fender secured to the vehicle's body to the wheel opening of the fender in order to protect the fender from damage due to flying objects, such as gravel, etc.

Various other objects, advantages, and features of the invention will become apparent to those skilled in the art from the following discussion, taken in conjunction with the accompanying drawing, in which:

DESCRIPTION OF THE DRAWING

FIG. 1 is a perspective view of a trailer taken from the forward side portion thereof with the trailer having the fender guard of this invention mounted on the forward portion of the trailer's visible fender;

FIG. 2 is a side elevation view of the fender portion of the trailer with the fender guard secured to the forward portion of the fender;

FIG. 3 is a top plan view of the fender portion of the trailer shown in FIG. 2; and FIG. 4 is a sectional view of the fender and fender guard taken on line 4—4 of FIG. 3 showing a layer of adhesive material between the fender guard and the fender and additionally showing in dashed lines a screw type fastener and a rivet type fastener extending through the fender guard and the fender.

The following is a discussion and description of preferred specific embodiments of the fender guard structure of this invention, such being made with the reference to the drawing, whereupon the same reference numerals are used to indicate the same or similar parts and/or structure. It is to be understood that such discussion and description is not to unduly limit the scope of the invention.

DESCRIPTION OF PREFERRED EMBODIMENT

Referring to the drawing in detail and in particular to FIG. 1, a fender guard structure of this invention, indicated generally at 10, is shown mounted on the fender of a trailer, indicated at 12. The fender of the trailer, indicated at 14, is a typical type of fender for which the fender guard 10 of this invention is constructed and adapted to be used. The fender 14 has an inner side portion 18 secured to the vehicle's sidewall 19 with the fender's wall portion 20 extending directly outward from the inner side portion 18 and shaped to cover the wheels 22 and 24 and having the outer wall portion 20 merging into an outer sidewall portion 26. The outer sidewall portion 26 has the wheel opening 28 therein. In the fender structure 14 as shown in the drawing, the wall portion of the fender extends substantially perpendicularly from the sidewall 19 of the trailer's body, and a running board 30 is provided on the lower portion of the trailer body in front of the fender 14. Inasmuch as the fender structure 14 shown encloses a tandem wheel arrangement on the trailer 12 the fender has a horizontal center top portion with curved and generally downwardly extending forward and rear wall portions of the same width as the center portion. The fender's forward wall portion is visible in FIG. 4 and indicated at 25. The forward wall portion 25 of the fender 14 joins the running board 30 on its lower end as shown clearly in FIGS. 2 and 3.

The fender guard 10 is mounted on the forward portion of the fender 14 and extends from the lower forward portion of the fender's forward wall portion to the upper portion of the fender, preferably terminating essentially at the top of the fender. The fender guard 10 is a hard surfaced member constructed in a pre-formed shape to correspond with the shape of the forward portion of the vehicle's fender 14; structurally it includes a forward portion 34 merging into a shaped edge portion 36. When the fender guard is not mounted it is bendable and can be bent somewhat to conform to the shape of a fender. When mounted with a fender the fender guard's forward portion 34 fits over the forward wall portion 25 of the fender and the fender guard's edge portion 36 fitting over the outer sidewall portion 26 of the fender terminating at the wheel opening 28. FIG. 4 shows in a cross-sectional view the fender guard 10 mounted with the fender and in FIG. 4 it can be seen that the inner edge 38 of the fender guard's forward portion 34 terminates at or in close proximity to the vehicle sidewall 19 and the fender guard's opposite edge portion 40 terminates at or in close proximity to the fender's wheel opening 28.

In mounting the fender guard 10 of this invention with a vehicle fender 14 it is preferably positioned on the forward portion of the fender as illustrated in the drawing. The fender guard's lower forward edge portion 42 terminates at the lowest point of the fender which is at the running board 30 for the fender and vehicle structure shown in the drawing. The fender guard's upper edge portion 44 terminates at or approximately at the top of the fender so the fender guard essentially completely covers the forwardly disposed portion of the fender 14. In attaching or mounting the fender guard 10 on the fender structure, it can be attached by an adhesive material such as is indicated at 46 and shown in FIG. 4. Any suitable adhesive can be used to attach the fender guard to the fender, for example, an adhesive commonly known as contact cement can be used to attach the fender guard to the fender or epoxy type resins can be used. An alternative to attaching the fender guard 10 to the fender by adhesive is to attach the fender by suitable fasteners, such as screws, rivets, bolts, etc., through apertures in the peripheral portions of the fender guard member and corresponding apertures in the fender. A sheet metal screw is shown in dashed lines and indicated at 48 in FIG. 4 to illustrate one type of fastener usable to secure the fender guard to the fender and a rivet is shown in dashed lines and indicated at 50 in FIG. 4 to illustrate another type of fastener suitable for attaching the fender guard. Preferably, when fasteners are used to attach the fender guard a plurality of them is used with the fasteners being spaced around the perimeter portion of the fender guard at spaced intervals. It is to be understood that fasteners other than screws and rivets can be used to attach the fender guard to the fender and hold it in place. Additionally, it is to be noted that if desired an adhesive material in combination with fasteners can be used to attach the fender guard of this invention.

In construction of the fender guard 10 of this invention it is preferably molded in the shape of the forward portion of the fender on which it is to be attached. Preferably, the fender guard 10 is constructed of a reinforced plastic material to give it resilient and durable properties as well as a hard surface. More preferably, the fender guard 10 of this invention is constructed of a fiberglass reinforced polyester, polyepoxide, or the like, resin material. In constructing the fender guard 10 it is molded to the shape of the forward portion of the fender on which it is to be attached or mounted so the shape of the fender guard and the portion merging between its forward portion 34 and its edge portion 36 will be shaped to correspond properly with the shape of the specific fender structure. In the molding process of constructing the fender guard, fiberglass cloth is applied in one or more layers in a mold as reinforcement material for the plastic resin. If desired fiberglass reinforcement material in a form other than a cloth can be used. If desired the fender guard can be constructed slightly longer and wider than the fender on which it is to be attached so the edge portions of the fender guard can be trimmed as needed to fit the specific fender. It is to be noted that the specific shape of the fender guard 10, as shown in the drawing, is not to unduly restrict the scope of the invention in that the fender guard can be constructed for fenders shaped different than the fenders 14 on the trailer 12 as illustrated.

In practice, it has been found that the fender guard 10 when mounted on a utility trailer such as the trailer 12 shown in the drawing prevents extensive gravel damage to the fender. Under normal use conditions the fenders of a vehicle such as the trailer will begin rusting once the paint has been knocked away by gravel. In practice it has been found that the fender guard being constructed of fiberglass reinforced polyester resin material will provide protection for the fender's forward portion.

In the manufacture of the fender guard structure of this invention, it is obvious that the fender guard can be easily constructed to achieve the end product. The fender guard is a molded substantially rigid resilient member, preferably constructed from a fiberglass reinforced plastic material, which is easily mountable with the forward portion of a vehicle's fender. The fender guard can be molded to the shape of a specific fender by common and well known molding techniques so the fender guard will lie in a close relation to the fender when mounted thereon. It is to be noted that the fender guard can be colored as desired to correspond with the finish of a vehicle or it can be painted with the vehicle.

In the use of the fender guard structure of this invention, it is seen that same provides a fender guard structure mountable on the forward portion of a vehicle's fender to prevent damage to the fender due to gravel, flying rocks, etc. Once the fender guard is installed on the fender of a vehicle it remains on the vehicle as a permanent fixture and can be colored so it will not detract from the appearance of the vehicle. The fender guard can be mounted with the fender by using an adhesive material or by securing it with fasteners, either attachment means being at the option of the user. In practice both means of attaching the fender guard to a fender have been found to be suitable for mounting the fender guard on a vehicle.

As will become apparent from the foregoing description of the applicant's fender guard structure, relatively inexpensive and simple means have been provided to protect the forward portion of a vehicle's fender from damage such as would be encountered by flying gravel, rocks, etc. The fender guard structure is economical to produce in that it is constructed of a fiberglass reinforced plastic material and it can be easily and quickly molded to the shape of the vehicle fenders. The fender guard structure is easily mountable on the fender of the vehicle and when mounted can be colored to correspond with the finish of the vehicle so it would not necessarily be detractive from the vehicle's appearance.

While the invention has been described in conjunction with preferred specific embodiments thereof, it will be understood that this description is intended to illustrate and not to limit the scope of the invention, which is defined by the following claims.

I claim:

1. In a vehicle fender having an inner side portion secured to a vehicle, an outer sidewall portion and a forward wall portion merging into said outer sidewall portion, said outer sidewall portion having a wheel opening therein, the improvement of a guard for said fender in combination therewith, comprising:
   a. a relatively thin, bendable, impervious hard surfaced member mounted on the forward portion of said fender and having a shaped edge portion overlying said fender's outer sidewall portion from said wheel opening to said forward wall portion and an integral forward portion to substantially completely cover said fender's forward wall portion, and
   b. said member being secured flush against the exterior surface of said fender.
2. The guard of claim 1, wherein,
   a. said forward portion extends from the bottom of said forward portion of said fender to a point above the top of said fender.
3. The guard of claim 2, wherein, said member is constructed of a fiberglass reinforced polyester resin material and secured to said fender by an adhesive material.

* * * * *